US009737079B2

United States Patent
Wang

(10) Patent No.: US 9,737,079 B2
(45) Date of Patent: Aug. 22, 2017

(54) KNEADING DOUGH HOOK ASSEMBLY AND KNEADING DOUGH MACHINE CONTAINING THE SAME

(71) Applicant: SHENZHEN MUREN APPLIANCE CO., LTD, Shenzhen, Guangdong (CN)

(72) Inventor: Wenxiong Wang, Shenzhen (CN)

(73) Assignee: SHENZHEN MUREN APPLIANCE CO., LTD, Shenzhen (CN)

( * ) Notice: Subject to any disclaimer, the term of this patent is extended or adjusted under 35 U.S.C. 154(b) by 253 days.

(21) Appl. No.: 14/706,046

(22) Filed: May 7, 2015

(65) Prior Publication Data
US 2015/0230480 A1    Aug. 20, 2015

Related U.S. Application Data

(63) Continuation of application No. PCT/CN2014/073397, filed on Mar. 13, 2014.

(30) Foreign Application Priority Data

Jan. 20, 2014 (CN) ...................... 2014 2 0035814 U

(51) Int. Cl.
*A21C 1/14* (2006.01)
*A21C 1/02* (2006.01)

(52) U.S. Cl.
CPC .............. *A21C 1/1405* (2013.01); *A21C 1/02* (2013.01); *A21C 1/147* (2013.01)

(58) Field of Classification Search
CPC ..................................... A21C 1/1405
USPC ........................ 366/287, 288, 331
See application file for complete search history.

(56) References Cited

U.S. PATENT DOCUMENTS 4,337,000 A * 6/1982 Lehmann ............. A21C 1/1405
366/288
6,908,222 B2 * 6/2005 Brunswick .......... A47J 43/0705
366/331

FOREIGN PATENT DOCUMENTS

CN    202269922 U    6/2012
CN    102973171 A    3/2013

* cited by examiner

*Primary Examiner* — David Sorkin

(57) ABSTRACT

The patent application relates to a kneading dough hook assembly and the kneading dough machine containing the same. The kneading dough hook assembly includes a mounting frame, a first kneading dough hook, a second kneading dough hook, a first fool-proof mechanism and a second fool-proof mechanism. The mounting frame includes two mounting rods. The first and second kneading dough hooks are mounted on the two mounting rods respectively. The first fool-proof mechanism is provided between the first kneading dough hook and its corresponding first mounting rod. The second fool-proof mechanism is provided between the second kneading dough hook and its corresponding second mounting rod.

14 Claims, 9 Drawing Sheets

KNEADING DOUGH HOOK ASSEMBLY AND KNEADING DOUGH MACHINE CONTAINING THE SAME

CROSS REFERENCE TO RELATED APPLICATIONS

This application is a continuation application of PCT/CN2014/073397, filed on Mar. 13, 2014, which claims priority of Chinese patent application No. 201420035814.4 filed on Jan. 20, 2014, the contents of which all hereby incorporated by reference.

TECHNICAL FIELD

The patent application relates to the technical field of automatic dough kneading. Specifically, it relates to a kneading dough hook assembly and the kneading dough machine containing the same.

BACKGROUND

The automatic kneading dough machine is a domestic food processing tool. The flour and water are placed in the mixing pot of the kneading dough machine. The mixing pot is provided with a kneading dough hook. The kneading dough hook rotates in the mixing pot driving by the driving device, in order to mix flour and water and knead dough, replacing manual kneading dough. It is time-saving, convenient and healthy. However, in the process of kneading the dough, conventional kneading dough machines use a single kneading dough hook to complete the kneading dough. During the operation, the dough tends to rotate together with the kneading dough hook, causing low efficiency. The effect of kneading dough is not ideal. Further, under the unbalanced force of the single kneading dough hook, the machine vibrates and shakes with a large extent.

SUMMARY

The primary object of this patent application is to provide a kneading dough hook assembly, which can overcome the deficiencies of the conventional kneading dough hook and provides good kneading dough effect.

Another object of the present patent application is to provide a kneading dough machine, which can overcome the deficiencies of the conventional kneading dough machine, provide ideal kneading dough results, and reduce vibration and shaking.

To achieve the above objects, the patent application adopts the following technical solutions:

A kneading dough hook assembly includes a mounting frame, a first kneading dough hook, a second kneading dough hook, a first fool-proof mechanism and a second fool-proof mechanism. The mounting frame includes a first mounting rod and a second mounting rod. The first kneading dough hook is mounted on the first mounting rod. The second kneading dough hook is mounted on the second mounting rod. The first fool-proof mechanism is provided between the first kneading dough hook and the first mounting rod. The second fool-proof mechanism is provided between the second kneading dough hook and the second mounting rod.

The first fool-proof mechanism includes a first recess and a first projection. The first recess and the first projection are provided on the first mounting rod and first kneading dough hook respectively. The second fool-proof mechanism includes a second recess and a second projection. The second recess and the second projection are provided on the second mounting rod and second kneading dough hook respectively.

The first recess is provided on the first mounting rod, the first projection is provided on the first kneading dough hook. The second recess is provided on the second mounting rod, and the second projection is provided on the second kneading dough hook.

The position of the first recess is opposite to the position of the second recess.

The kneading dough hook assembly further includes a transmission mechanism which is connected to the first kneading dough hook and the second kneading dough hook. The transmission mechanism drives first kneading dough hook and the second kneading dough hook to rotate simultaneously.

The transmission mechanism includes a gear disk, a sun gear wheel, a first planetary gear wheel and a second planetary gear wheel. The gear disk is provided on the mounting frame. Internal gears are provided on an inner wall of the gear disk. The sun gear wheel connects to a power unit. The first planetary gear wheel meshes with the sun gear wheel and the internal gears of the gear disk simultaneously. The first planetary gear wheel is connected to the first kneading dough hook. The second planetary gear wheel meshes with the sun gear wheel and the internal gears of the gear disk simultaneously. The second planetary gear wheel is connected to the second kneading dough hook.

An upper end of the first dough is shaped as a first knife handle shaft. A lower end of the first mounting rod is shaped as a first sleeve. The first knife handle shaft is inserted into the first sleeve.

An upper end of the second dough is shaped as a second knife handle shaft. A lower end of the second mounting rod is shaped as a second sleeve. The second knife handle shaft is inserted into the second sleeve.

The first kneading dough hook includes an upper part, a middle part and a lower part. The middle part includes three contour lines which are not in a same space plane. The lower part is shaped as a curved piece.

The second kneading dough hook includes an upper portion, an upper middle portion, a middle portion and a bottom portion. A side of the upper middle portion is shaped as a small arcuate curved surface. The middle portion is shaped as a twisted curve and the bottom portion is shaped as a hook bending upward.

A first mounting post is provided on the upper end of the first kneading dough hook. A second mounting post is provided on the upper end of the second kneading dough hook. A first L-shaped mounting groove which corresponds to the first mounting post is provided on the first mounting rod and a second L-shaped mounting groove which corresponds to the second mounting post is provided on the second mounting rod.

A kneading dough machine includes the above kneading dough hook assembly.

With the above technical solution, the kneading dough hook assembly uses two hooks instead of a single hook. The quality, efficiency, energy use rate of the patent application which uses two hooks is better than that of the single-hook. With the same amount of flour, the time consumed by the present patent application is shorter than that of the single hook. The patent application with two hooks realizes a more comprehensive function and kneads the dough efficiently. Due to the cooperation of the two hooks, it produces 6000 contact points. The more contact points, the better as described. The two hooks simulate and even surpass the capabilities of kneading dough by hand. With two hooks simulating all the action of kneading dough by hand, such as kneading, rubbing, stirring, pressing, pulling, squeezing, pushing, and etc, the present patent application has a high efficiency. The effect of kneading dough is good and the stability is prominent. The two hooks not only have a good effect and quality but also represent a progress and surpass. Further, the second kneading dough hook is able to balance the vibration caused by the rotation of the first kneading dough hook, making the machine more stable, reducing the noise caused by vibration, and improving work stability during the operation.

DETAILED DESCRIPTION

In order to understand the purposes, technical solutions and advantages of the patent application, a detailed description of the patent application is provided accompanying drawings and embodiments of the patent application. It should be understood that the specific embodiments described herein are only used to explain the patent application and are not intended to limit the patent application.

Figure 1:
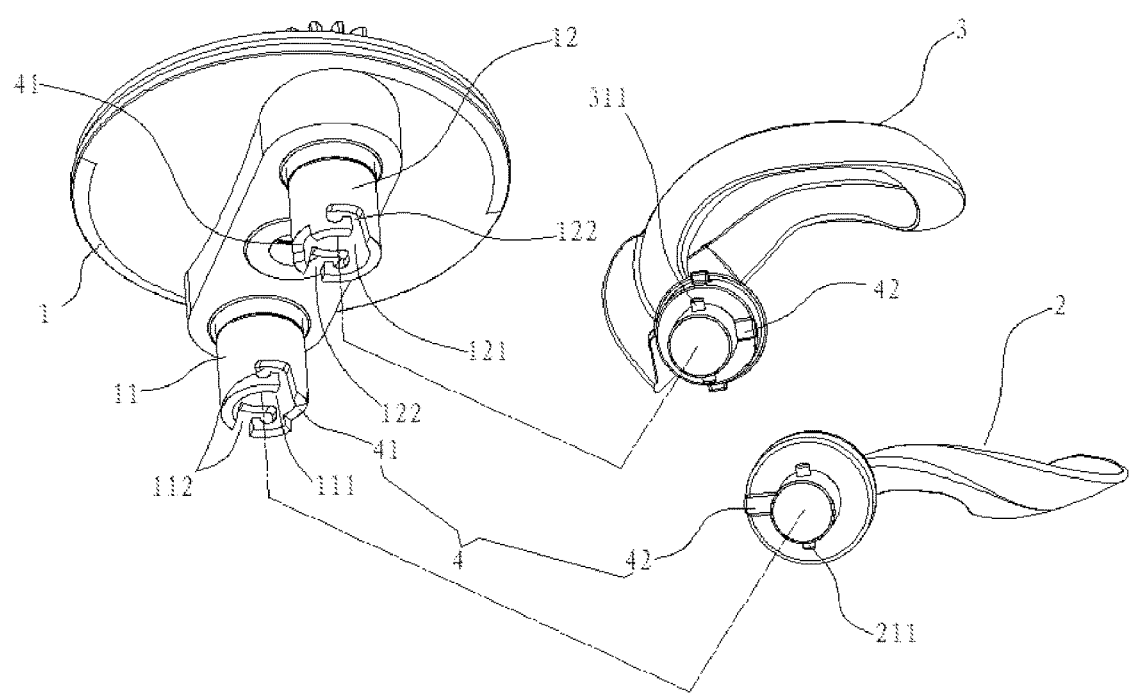
FIG. 1 is an exploded perspective view of a kneading dough hook assembly according to an embodiment of the present patent application.
Figure 2:
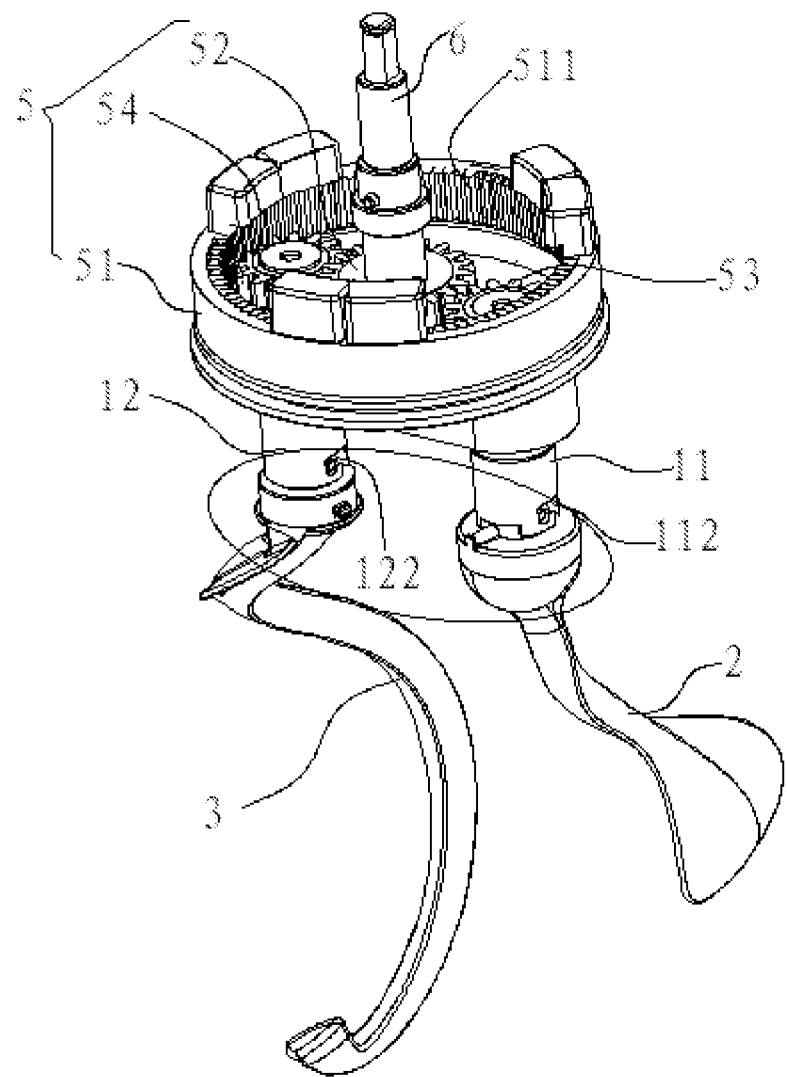
FIG. 2 shows the assembled view of kneading dough hook assembly according to the present patent application.

Referring to FIGS. 1 and 2, the present patent application discloses a kneading dough hook assembly. The kneading dough hook assembly includes a mounting frame 1, a first kneading dough hook 2, a second kneading dough hook 3, two fool-proof mechanisms 4 and a transmission mechanism 5.

The mounting frame 1 has two mounting rods 11, 12. The lower ends of the mounting rods 11, 12 are shaped as sleeves 111, 121. Further, the lower ends of the mounting rods 11, 12 are also provided with L-shaped mounting grooves 112, 122. In the present embodiment, the mounting grooves 112, 122 are arranged in pairs.

Figure 4:
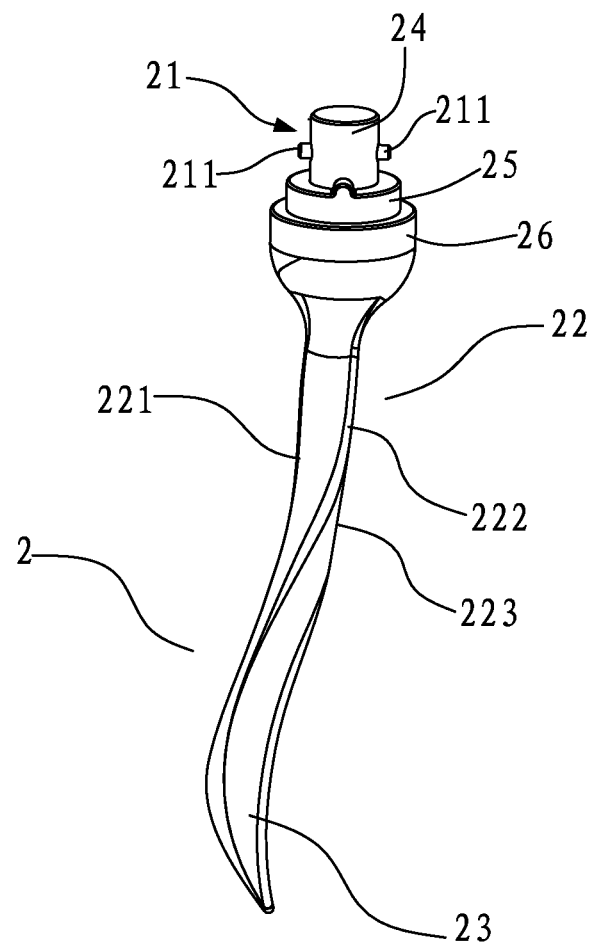
FIG. 4 shows the first structure of the first kneading dough hook according to the present patent application.
Figure 5:
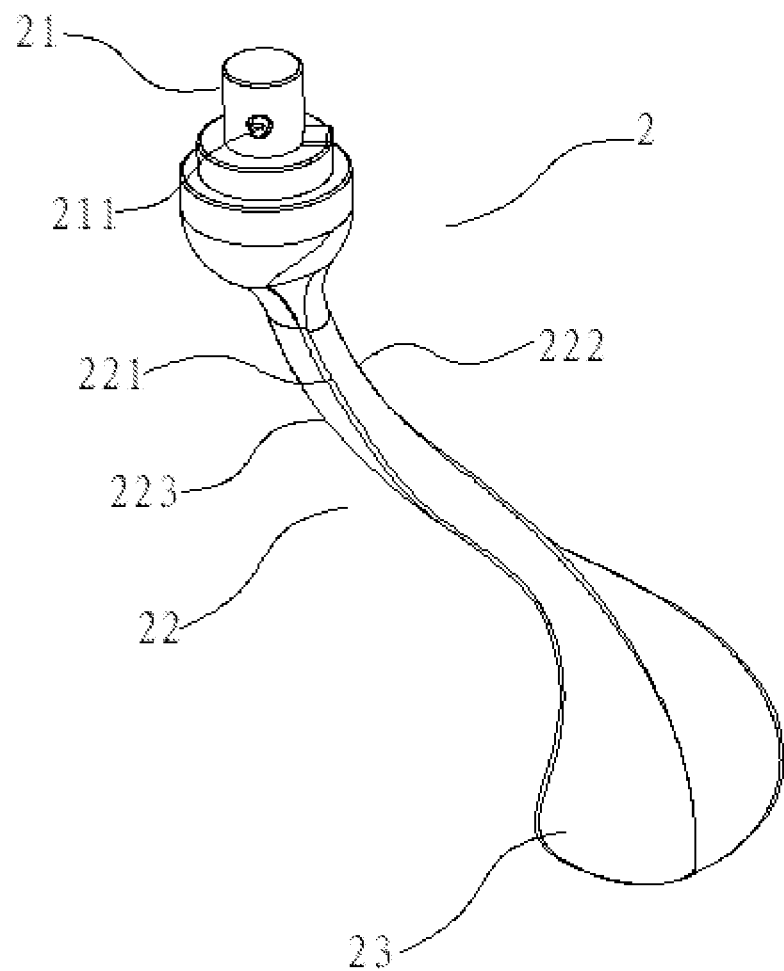
FIG. 5 shows the second structure of first kneading dough hook according to the present patent application.

Referring to FIGS. 4 and 5, the first kneading dough hook 2 has an upper part 21, a middle part 22 and a lower part 23. The upper part 21 is shaped as a knife handle shaft. The upper part 21 comprises a first top portion 24, a first extending portion 25 extending from the first top portion 24, and a first connecting portion 26 extending from the first extending portion 25. The middle part 22 extends from the first connecting portion 26. The first top portion 24 is provided with mounting posts 211. An area of the cross section of the first top portion 24 is less than an area of the cross section of the first extending portion 25. The area of the cross section of the first top portion 24 is less than an area of the cross section of the mounting rod 11. The area of the cross section of the mounting rod 11 is equal to an area of the cross section of the mounting rod 12. The mounting posts 211 correspond to L-shaped mounting groove 112 provided on the mounting rod 11. The middle part 22 includes three contour lines 221, 222 and 223 which are not in the same space plane. The lower part 23 is shaped as a curved piece. In the specific implementation, it can be in the shape of an ear or a palm, which is easy for kneading dough.

Referring to FIG. 2, the knife handle shaft of the upper part 21 is inserted into the sleeve 111 of the lower end of the mounting rod 11. The mounting post 211 is just located in the mounting groove 112. The knife handle shaft can effectively avoid mixing the metal powder caused by wearing the knife into the food in the operating state, ensuring security. Further, the middle part 22 of the first kneading dough hook 2, which includes three contour lines 221, 222 and 223 being not in the same space plane, makes the first kneading dough hook 2 cut into the dough easily during the rotation regardless of angle. The resistance of the knife tool is dispersed during kneading dough. It is fully taken into account the forces during operation by using fluid force mechanics. With two hooks simulating all the action of kneading dough by hand, such as kneading, rubbing, stirring, pressing, pulling, squeezing, pushing, and etc, it has high efficiency. The effect of kneading dough is good and the stability is prominent. The lower part 23 is in the shape of ear. It is the core part of the entire first kneading dough hook 2 and the most important function part of the entire hook. During rotation, it produces rubbing and squeezing and the back and forth force. The total contact points with the pot during rotating one cycle are 2160. By using the second kneading dough hook 3, its role and effect will be more perfectly reflected.

Referring to FIG. 2, the kneading dough hook assembly further includes a transmission mechanism 5 which is connected to the first kneading dough hook 2 and the second kneading dough hook 3. The transmission mechanism 5 drives the first kneading dough hook 2 and the second kneading dough hook 3 to rotate simultaneously.

The transmission mechanism 5 includes a gear disk 51, a sun gear wheel 52, a first planetary gear wheel 53 and a second planetary gear wheel 54. When assembled, the gear disk 51 is provided on the mounting frame 1. The inner wall of the gear disk 51 has internal gears 511. The sun gear wheel 52 connects to the power unit (not shown in the Figures) through the transmission shaft 6. The first planetary gear wheel 53 meshes with the sun gear wheel 52 and the internal gears 511 of the gear disk 51. The first planetary gear wheel 53 is connected to the first kneading dough hook 2. The second planetary gear wheel 54 meshes with the sun gear wheel 52 and the internal gears 511 of the gear disk 51. The second planetary gear wheel 54 is connected to the second kneading dough hook 3. In practice, the positions of the first kneading dough hook 2 and the second kneading dough hook 3 are interchangeable.

During operation, the power unit drives the transmission shaft 6 to rotate. The transmission shaft 6 drives the sun gear wheel 52 to rotate. The sun gear wheel 52 drives the first planetary gear wheel 53 and the second planetary gear wheel 54 to rotate simultaneously. In other words, the first kneading dough hook 2 and the second kneading dough hook 3 rotate simultaneously to knead dough. The first planetary gear wheel 53 and the second planetary gear wheel 54 are rotated along the inner wall of the gear disk 51.

Figure 6:
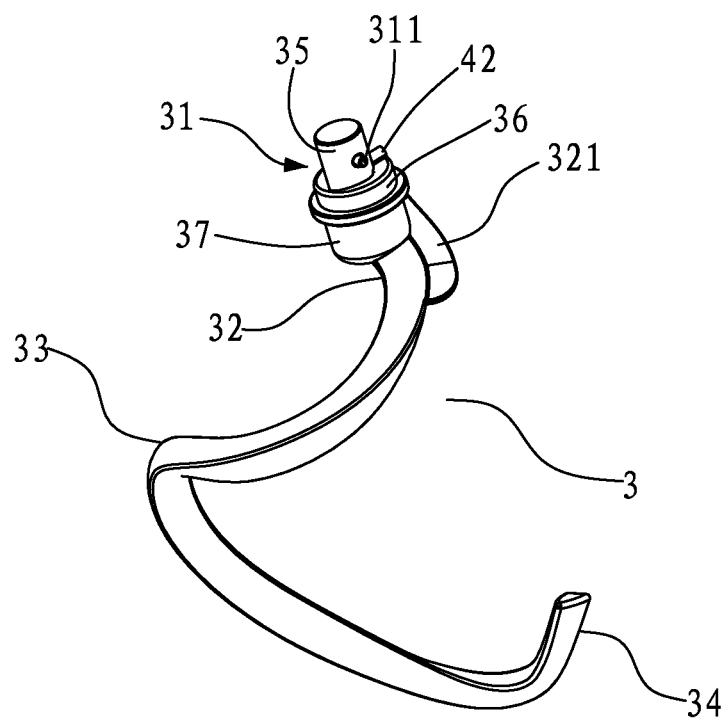
FIG. 6 shows the first structure of the second kneading dough hook according to the present patent application.
Figure 7:
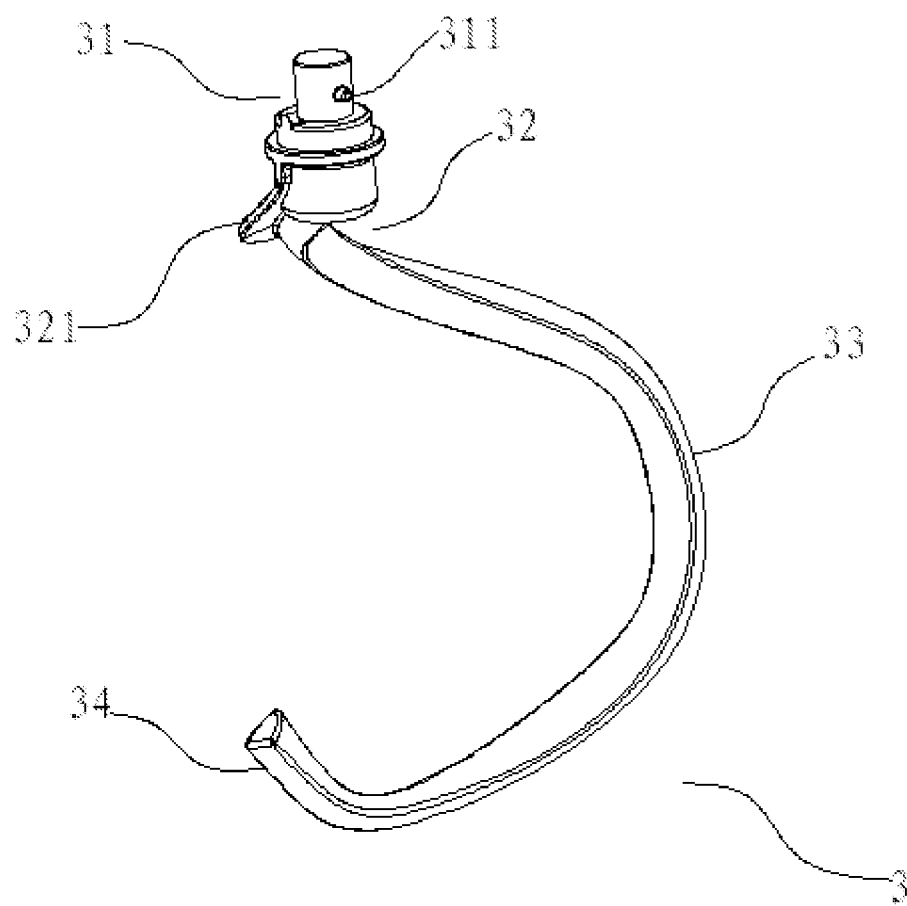
FIG. 7 shows the second structure of the second kneading dough hook according to the present patent application.

Referring to FIGS. 6 and 7, the second kneading dough hook 3 includes an upper portion 31, an upper middle portion 32, a middle portion 33 and a bottom portion 34. The upper portion 31 is shaped as a knife handle shaft. The upper part 31 comprises a second top portion 35, a second extending portion 365 extending from the second top portion 35, and a second connecting portion 37 extending from the second extending portion 36. The middle part 32 extends from the second connecting portion 37. The second top portion 34 is provided with a mounting post 311. An area of the cross section of the second top portion 35 is less than an area of the cross section of the second extending portion 36. The area of the cross section of the second top portion 35 is less than the area of the cross section of the mounting rod 12. The mounting post 311 corresponds to L-shaped mounting groove 122 provided on the mounting rod 12. One side of the upper middle portion 32 is shaped as a small arcuate curved surface 321. The middle portion 33 is shaped as a twisted curve. The bottom portion 34 is shaped as a hook bending upward.

During operation, the knife handle shaft of the upper portion 31 is inserted into the sleeve 121 of the mounting rod 12. The mounting post 311 is exactly located in the L-shaped mounting groove 122. The knife handle shaft can effectively avoid mixing metal powder caused by wearing the knife into the food in the operating state, ensuring security. The curved surface 321 of one side of the upper middle portion 32 produces a pressure force during rotating the second kneading dough hook, liking a man's hand pressing dough down. The curved design of the middle portion 33 is the main effect part of the second kneading dough hook 3, and is also the important function part of the entire second kneading dough hook 3. The shape of each curved line of the middle portion 33 has fully taken into account of the resistance of the second kneading dough hook 3 during the movement and is in the reasonable scientific mechanics streamline design. Its main role is to rub. During the rotation (rotating around its own axis and revolving around the axis of the sun gear wheel), it produces a series of actions, such as kneading, rubbing, pulling and squeezing, simulating the action of kneading dough by palm. The bottom portion 34 is an essential part of the second kneading dough hook. It produces a rotary extrusion pressure during the rotation, turning the entire dough from the inside over, which is equivalent to a hand. During using the kneading dough machine, the second kneading dough hook 3 produces a total of 3840 contact points (the more contact points, the better effect and quality of kneading dough) during the whole movement (rotation and revolution).

Figure 3:
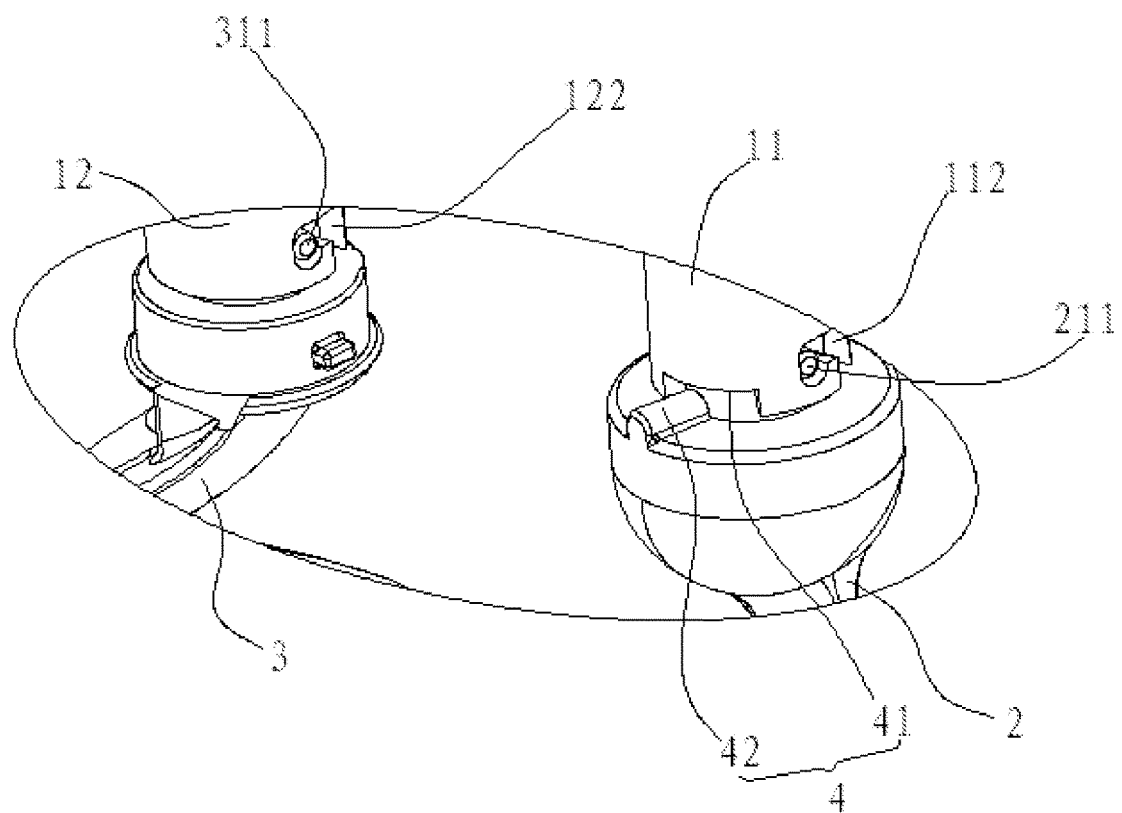
FIG. 3 is a partially enlarged view of FIG. 2.

Referring to FIGS. 2 and 3, there are two fool-proof mechanisms 4, which are located between the first kneading dough hook 2 and the mounting rod 11 and between the second kneading dough hook 3 and the mounting rod 11.

In particular, the fool-proof mechanism 4 includes a recess 41 and a projection 42. When implemented, the recess 41 is provided on the kneading dough hook, and the projection 42 is provided on the mounting rod. Alternately, the recess 41 is provided on the mounting rod, and the projection 42 is provided on the second kneading dough hook. In the present embodiment, the recess 41 of one fool-proof mechanism 4 is provided on the mounting rod 11, the projection 42 of this fool-proof mechanism 4 extends from the first extending portion 25 of the first kneading dough hook 2 along a first direction. The recess 41 of another fool-proof mechanism 4 is provided on the mounting rod 12, the projection 42 of this another fool-proof mechanism 4 extends from the second extending portion 36 of the second kneading dough hook 3 along a second direction. The first direction is opposite to the second direction. The position of the projection 42 on the mounting rod 11 is in an opposite direction of the position of the projection 42 on the mounting rod 12. This design greatly improves the efficiency and convenience for the customers, and avoids the collision phenomenon of the two kneading dough hooks 2, 3 caused by mis-angle installation. In actual use, the first kneading dough hook 2 can be mounted on the mounting rod 11, and also can be mounted on the mounting rod 12. Similarly, the second kneading dough hook 3 can be mounted on the mounting rod 11, and also can be mounted on the mounting the rod 12. In other words, the mounting positions of the first kneading dough hook 2 and the second kneading dough hook 3 can be interchanged. Due to the fool-proof mechanism 4, the first kneading dough hook 2 and the second kneading dough hook 3 will not cause the collision phenomenon even they are exchanged.

Figure 8:
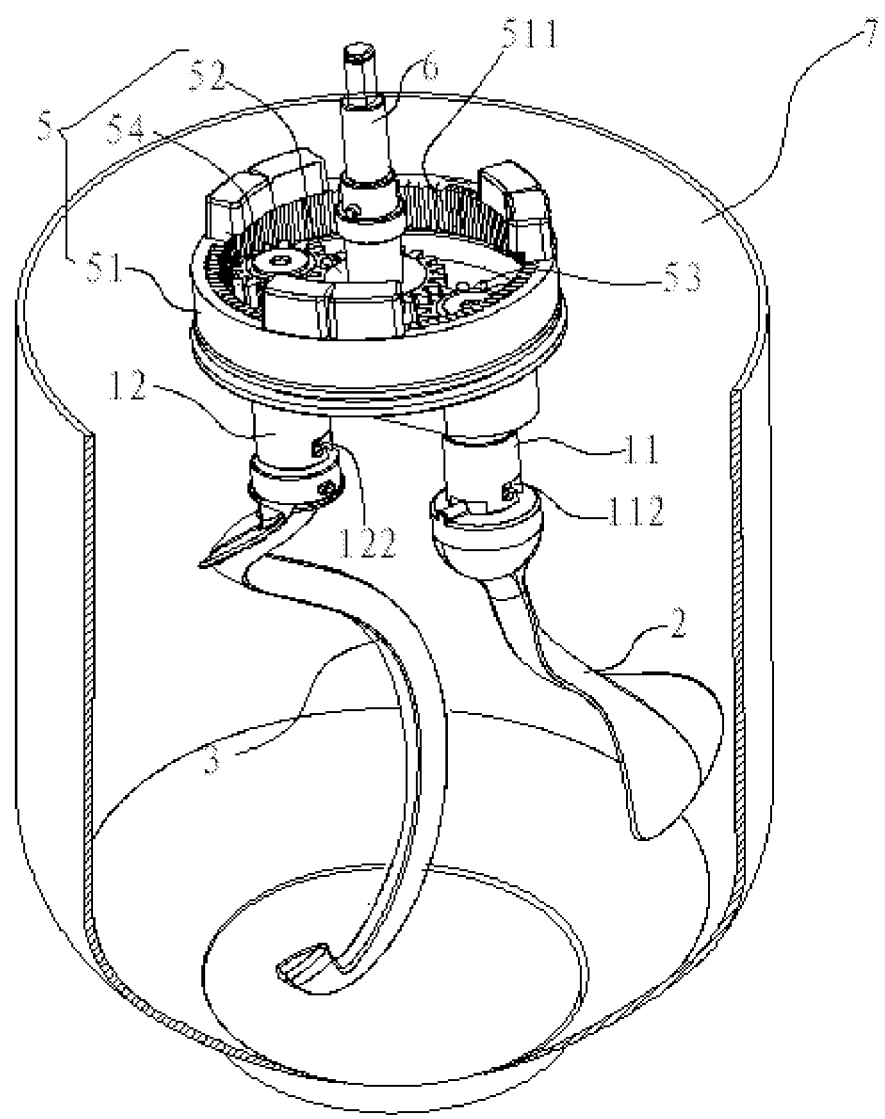
FIG. 8 shows a part of the kneading dough machine according to the present patent application.

Referring to FIG. 8, the present patent application also discloses a kneading dough machine which includes a driving device (not shown in the Figures), a transmission device, a container 7 and the above-described kneading dough hook assembly.

In the present embodiment, the planetary gear wheels are used for performing power transmission.

Figure 9:
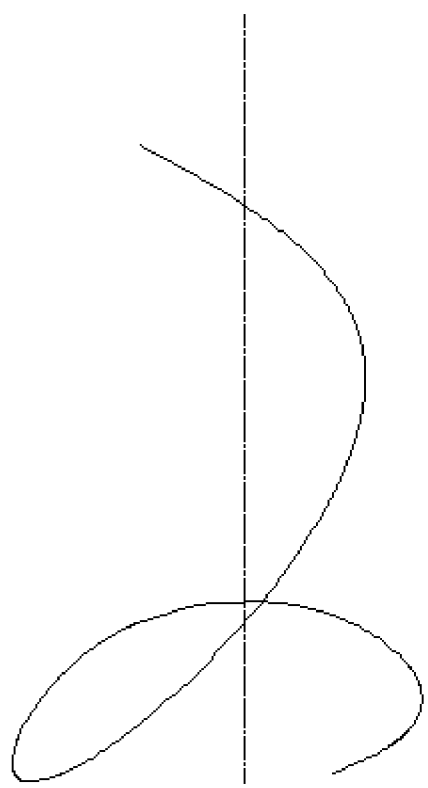
FIG. 9 shows a curve by combing the movement path lines of two kneading dough hooks.

FIG. 9 shows a curve by combing the movement path lines of two kneading dough hooks. It will continue moving along this curve line periodically repeated. The size and blade angle of two kneading dough hooks are assigned correctly. Kneading dough is complete during using the kneading dough machine. The result of kneading dough is good.

The above embodiment does not intend to limit the scope of the claims. Numerous modifications and substitutions based on the substantial of the present patent application by a person skilled in the art fall within the scope of the present patent application.

The invention claimed is:

1. A kneading dough hook assembly comprising:
   a mounting frame;
   a first kneading dough hook;
   a second kneading dough hook;
   a first fool-proof mechanism; and
   a second fool-proof mechanism;
   wherein the mounting frame comprises a first mounting rod and a second mounting rod, the first kneading dough hook is mounted on the first mounting rod, the second kneading dough hook is mounted on the second mounting rod;
   wherein the first fool-proof mechanism is provided between the first kneading dough hook and the first mounting rod; and the second fool-proof mechanism is provided between the second kneading dough hook and the second mounting rod;
   wherein the first kneading dough hook comprises an upper part, the upper part comprises a first top portion, a first extending portion extending from the first top portion, and a first connecting portion extending from the first extending portion;
   wherein the second kneading dough hook comprises an upper portion, the upper portion comprises a second top portion, a second extending portion extending from the second top portion, and a second connecting portion extending from the second extending portion;
   wherein the first fool-proof mechanism comprises a first recess and a first projection, the first recess is provided on the first mounting rod, and the first projection extends from the first extending portion along a first direction;

wherein the second fool-proof mechanism comprises a second recess and a second projection, the second recess is provided on the second mounting rod, and the second projection extends from the second extending portion along a second direction;

wherein the first direction is opposite to the second direction;

wherein a first mounting post is provided on the first top portion, a second mounting post is provided on the second top portion, a first mounting groove corresponding to the first mounting post is provided on the first mounting rod, and a second groove corresponding to the second mounting post is provided on the second mounting rod.

2. The kneading dough hook assembly of claim 1, wherein a position of the first recess is opposite to a position of the second recess.

3. The kneading dough hook assembly of claim 1, further comprising a transmission mechanism which is connected to the first kneading dough hook and the second kneading dough hook; wherein the transmission mechanism drives first kneading dough hook and the second kneading dough hook to rotate simultaneously.

4. The kneading dough hook assembly of claim 3, wherein the transmission mechanism comprises a gear disk, a sun gear wheel, a first planetary gear wheel and a second planetary gear wheel; the gear disk is provided on the mounting frame; internal gears are provided on an inner wall of the gear disk; the sun gear wheel connects to a power unit; the first planetary gear wheel meshes with the sun gear wheel and the internal gears of the gear disk simultaneously; the first planetary gear wheel is connected to the first kneading dough hook; the second planetary gear wheel meshes with the sun gear wheel and the internal gears of the gear disk simultaneously; the second planetary gear wheel is connected to the second kneading dough hook.

5. The kneading dough hook assembly according to claim 1, wherein an upper end of the first dough is shaped as a first knife handle shaft, a lower end of the first mounting rod is shaped as a first sleeve, and the first knife handle shaft is inserted into the first sleeve.

6. The kneading dough hook assembly of claim 5, wherein an upper end of the second dough is shaped as a second knife handle shaft, a lower end of the second mounting rod is shaped as a second sleeve, and the second knife handle shaft is inserted into the second sleeve.

7. The kneading dough hook assembly of claim 5, wherein the first kneading dough hook further comprises a middle part and a lower part, the middle part comprises three contour lines which are not in a same space plane, and the lower part is shaped as a curved piece.

8. The kneading dough hook assembly of claim 7, wherein the second kneading dough hook further comprises an upper middle portion, a middle portion and a bottom portion, a side of the upper middle portion is shaped as a small arcuate curved surface, the middle portion is shaped as a twisted curve and the bottom portion is shaped as a hook bending upward.

9. The kneading dough hook assembly of claim 8, wherein the first L-shaped mounting groove is L-shaped and the second mounting groove is L-shaped.

10. A kneading dough machine comprising the kneading dough hook assembly of claim 1.

11. The kneading dough hook assembly of claim 1, wherein an area of the cross section of the first top portion is less than an area of the cross section of the first extending portion.

12. The kneading dough hook assembly of claim 1, wherein an area of the cross section of the first top portion is less than an area of the cross section of the first mounting rod.

13. The kneading dough hook assembly of claim 1, wherein an area of the cross section of the second top portion is less than an area of the cross section of the second extending portion.

14. The kneading dough hook assembly of claim 1, wherein an area of the cross section of the second top portion is less than an area of the cross section of the second mounting rod.

* * * * *